Patented Feb. 18, 1930

1,747,186

UNITED STATES PATENT OFFICE

WINFIELD SCOTT, OF AKRON, OHIO, ASSIGNOR TO THE RUBBER SERVICE LABORATORIES CO., OF AKRON, OHIO, A CORPORATION OF OHIO

RUBBER-VULCANIZATION ACCELERATOR AND AGE-RESISTING COMPOUND

No Drawing.    Application filed November 20, 1924.   Serial No. 751,200.

My present invention is directed to the art of vulcanizing rubber, caoutchouc and similar substances by the aid of a new type of organic compounds as accelerators of the vulcanization process. More particularly, my invention is directed to the use in the rubber vulcanization process, of compounds possessing a plurality of functions, and having the property of importing a number of desirable characteristics to the vulcanized rubber product.

My invention is specifically directed to the use in rubber compounds of substances which very materially accelerate the vulcanization process and which impart very desirable and characteristic age resisting properties to the vulcanized product.

It is well known to rubber chemists that the use of certain organic compounds in rubber is practically precluded because of the fact that the presence of these substances in rubber apparently causes or aids in causing a comparatively rapid deterioration of the vulcanized product. Such rubber compounds are said to age badly—that is, the rubber becomes hard, loses a large part of its resiliency, while other characteristics such as its tensile strength are very detrimentally affected. An accelerator of commercial value should then, not only be of value in shortening the time required for the vulcanization of the rubber, but also should not have any detrimental effect on the vulcanized rubber compound during service.

I have now found a class of compounds which possess valuable properties in accelerating the rate of vulcanization of rubber, and which very materially lengthen the serviceable life of the cured product. The class of compounds to which I refer, comprises the reaction products of organic bases with arylhydroxy compounds, and particularly with the poly-hydroxy-benzenes. Both aliphatic and aromatic amines react comparatively readily with poly-hydroxy-benzenes, such as hydroquinone, pyrocatechin, pyrogallol, and similar substances to produce compounds having powerful reducing properties, and also possessing desirable vulcanization accelerating characteristics.

The compounds which I prefer to use with the above objects in view, may be prepared by reacting an amine with the hydroxy-benzene preferably, although not necessarily, in equi-molecular proportions. Thus, for example, hydroquinone and piperidine, when reacted in equi-molecular proportions, will combine in the following manner:

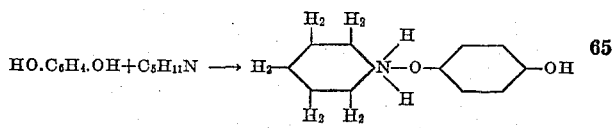

Different proportions of the reacting ingredients may be taken than those shown above. Thus, one molecular proportion of hydroquinone may be combined with two molecular proportions of the piperidine, or alternatively, two molecular proportions of the hydroxy-benzene, may be combined with one molecular proportion of the base, and all of the compounds so formed possess, as I have found, desirable vulcanization accelerating properties, and produce a rubber product which ages remarkably well.

In a similar way, another reaction product of my preferred type which imparts desirable age resisting properties to the vulcanized rubber product may be obtained by reacting hydroquinone with aniline in equal molecular proportions, or by using one molecular proportion of the former to two molecular proportions of the latter. In the latter case, hydroquinone dianilide,

is obtained, having a melting point of approximately 90° C. The toluidines, xylidines, naphthylamines and other aromatic bases react in a similar manner with hydroquinone or with other analogous polyhydroxy-benzenes. Hydroquinone will likewise combine with aliphatic amines. Thus, for example, one molecular proportion of di-ethyl-amine will react quite energetically with two molecular proportions of hydroquinone to produce the compound

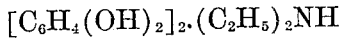

which melts at approximately 134° C. Other strongly basic amines, such as piperidine and benzylamine will react with hydroquinone in varying molecular proportions, such as 1 to 2; 1 to 1; and 2 to 1 to produce valuable accelerators of my preferred type.

Hydroquinone or other of the polyhydroxy-benzenes can also be combined with guanidine and its derivatives, and particularly with the di-substituted guanidines such as di-phenyl guanidine and di-o-tolyl-guanidine. The reaction between equi-molecular proportions of hydroquinone and di-phenyl-guanidine for example, may be readily carried out at ordinary temperatures by reacting the materials, preferably in the presence of a solvent such as ether or benzene or the like, to produce the di-phenyl-guanidine-hydroquinone reaction product which is stable when dry and possesses desirable properties as an anti-oxidant or age-resistant vulcanization accelerator.

Not only do organic bases of the type of the primary and secondary amines combine or react with the polyhydroxy-benzenes to produce the type of compounds as hereinbefore mentioned, but the tertiary amines such as tri-ethyl-amine, quinoline, and the like, also react with these materials to produce similarly constituted compounds possessing equally desirable accelerating and age resisting properties. Thus, for example, quinoline or its basic derivatives, either in the form of a salt such as the hydrochloride, or the free base, may be combined with resorcin to produce the double compound typical of my preferred class of accelerators.

Broadly then, the compounds which I prefer to use for the purpose and in the manner as hereinafter set forth, comprise the reaction products of organic bases of the aliphatic or aromatic series, and hydroxy-benzene compounds, particularly the poly-hydroxy-benzenes, and substituted benzenes. Moreover, other substances than amines may be reacted with the poly-hydroxy-benzenes to produce anti-oxidant accelerators. For example, I may use substances of lesser basicity than the amines, such as the so-called Schiff's bases, their polymers and the various aldehyde derivatives of these bases, such as the compound produced by the union of three molecular proportions of the aldehyde with two molecular proportions of the amine, and the various aldehyde derivatives of such compounds.

Although my preferred class of accelerators may be used in the manufacture of many different types of rubber compounds, the following example is given as typical of any of the materials hereinbefore mentioned. Hydroquinone-dibenzyl-amine is prepared by reacting hydroquinone and benzyl-amine in ether as a solvent, whereupon 1 part of the product so formed is mixed on the rubber mixing rolls with 100 parts of smoked sheet rubber, 5 parts of zinc oxide, and 3.5 parts of sulfur. Samples of the rubber compound prepared as shown were vulcanized in the usual manner by heating for 30 to 45 minutes in molds, under a pressure of 40 pounds of steam per square inch. Some of the rubber compound so obtained was compared with other similarly prepared and cured compound which was then additionally subjected to an artificial aging test by heating the compound for a period of 16 hours at a temperature of 70° C. under a pressure of 300 pounds of oxygen. The comparative results follow:

|  | Time of cure | Temp. of cure | Modulus at— | | | Tensile at break | Per cent elongation |
|---|---|---|---|---|---|---|---|
|  |  |  | 300% | 500% | 700% |  |  |
| Not aged | 30 minutes | 141° C. | 122 | 214 | 650 | 2260 | 950 |
|  | 45 minutes | 141° C. | 135 | 396 | 973 | 2615 | 885 |
| Aged | 30 minutes | 141° C. | 152 | 326 | 1055 | 2570 | 873 |
|  | 45 minutes | 141° C. | 190 | 449 | 1505 | 3100 | 845 |

While I have given various examples, illustrative of my preferred class of compounds, and have particularly pointed out certain reaction products obtained by the union of organic bases with various di- and tri-hydroxy benzenes, it is to be understood that I may also employ all derivaties of these compounds which possess properties similar to those of the substances specifically mentioned. Thus, in place of hydroquinone, I may substitute such of its derivatives as the tolu- or xylyl-hydroquinones and the like, or their ethers, the mono or di-halogen-hydroquinones, and other analogous substances.

It is to be noted that by employing my new type of compound as an accelerator, an actual improvement in the physical properties of the vulcanized product is realized in what corresponds to approximately two years of natural aging. This is evidenced in the above table by the higher modulus of the artificially aged product at the intermediate elongations, as well as by the higher tensile strength at break.

Others of my new type of accelerating and age resisting compounds may be used in place of the hydroquinone-di-benzyl-amine mentioned in the above example. Thus, I may mix in the usual manner, 100 parts of smoked sheet rubber, 5 parts of zinc oxide, 3.5 parts of sulfur and 1.0 part of piperidine-hydroquinone produced by the combination of piperidine and hydroquinone as hereinbefore described. The same general improvement in age resisting properties is exhibited by the rubber compound in which this material is used as an anti-oxidant accelerator as is shown by the following table in which the products mentioned above were prepared and tested in the manner as described in the first example.

|  | Time of cure | Temp. of cure | Modulus at— | | | Tensile at break | Per cent elongation |
|---|---|---|---|---|---|---|---|
|  |  |  | 300% | 500% | 700% |  |  |
| Not aged | 15 minutes | 141° C. | 129 | 280 | 842 | 2420 | 908 |
|  | 30 minutes | 141° C. | 199 | 417 | 1535 | 3125 | 850 |
| Aged | 15 minutes | 141° C. | 145 | 333 | 1100 | 2970 | 918 |
|  | 30 minutes | 141° C. | 200 | 516 | 1868 | 3320 | 833 |

Here again the excellent age resisting properties of the compounds are quite apparent and the rubber product shows better quality after subjection to the artificial aging test than before.

Other compounds produced as hereinbefore described by the reaction of an organic amine or a Schiff's base or a modified Schiff's base with a poly-hydroxy-benzene or derivatives thereof have all shown equally beneficial results when used as accelerators and age resisting compounds in rubber compositions similar to those shown above or in other types of rubber compounds readily apparent to those skilled in the art.

I do not limit my claims to any specific method of preparation of the various compounds mentioned nor to any definite amounts of these accelerating and age resisting compounds in the rubber mix as such factors will, of course, vary somewhat depending on the ingredients used in the preparation of the compounds or with the various compounding ingredients which may be used in the rubber mix. Nor do I limit my invention to any theories or statements advanced by way of explanation but I do limit my invention solely by the claims appended hereto and made a part of this specification and in which I intend to claim my invention as broadly as is permissible in view of the prior art.

What I claim is:

1. The process of producing vulcanized rubber possessing age resistant characteristics which comprises heating rubber and sulfur in the presence of a compound obtained by interacting an organic base and a hydroxy derivative of benzene.

2. The process of producing vulcanized rubber possessing age resistant characteristics which comprises heating rubber and sulfur in the presence of a compound obtained by interacting an organic base and a poly-hydroxy-benzene.

3. The process of producing vulcanized rubber possessing age resistant characteristics which comprises heating rubber and sulfur in the presence of a compound obtained by interacting an aliphatic amine and a poly-hydroxy-benezene.

4. The process of producing vulcanized rubber possessing age resistant characteristics which comprises heating rubber and sulfur in the presence of a compound obtained by interacting piperidine and hydroquinone.

5. The process of producing vulcanized rubber possessing age resistant characteristics which comprises heating rubber and sulfur in the presence of a compound obtained by interacting an organic base and a derivative of benzene containing more than one hydroxy group.

6. The process of producing vulcanized rubber possessing age resistant characteristics which comprises heating rubber and sulfur in the presence of a compound obtained by interacting a Schiff's base and a poly-hydroxy-benzene.

7. An age resisting rubber product comprising the vulcanization product of a mixture of rubber, sulfur and the compound obtained by interacting an organic base and a hydroxy derivative of benzene.

8. An age resisting rubber product comprising the vulcanization product of a mixture of rubber, sulfur and the compound obtained by interacting an organic base and a poly-hydroxy-benzene.

9. An age resisting rubber product comprising the vulcanization product of a mixture of rubber, sulfur and the compound obtained by interacting an aliphatic amine and a poly-hydroxy-benzene.

10. An age resisting rubber product comprising the vulcanization product of a mixture of rubber, sulfur and the compound obtained by interacting piperidine and hydroquinone.

11. An age resisting rubber product comprising the vulcanization product of a mixture of rubber, sulfur, and the compound obtained by reacting an organic base and a derivative of benzene containing more than one hydroxy group.

12. An age resisting rubber product comprising the vulcanization product of a mixture of rubber, sulfur and the compound obtained by interacting a Schiff's base and a poly-hydroxy-benzene.

13. The method of accelerating the vulcanization of caoutchouc which comprises vulcanizing the same in the presence of an amine hydroquinone reaction product.

14. The method of accelerating the vulcanization of caoutchouc which comprises vulcanizing the same in the presence of a primary amino hydroquinone reaction product.

15. The method of accelerating the vulcanization of caoutchouc which comprises vulcanizing the same in the presence of the reaction product of an aliphatic amine and an aryl poly-hydroxide.

16. A caoutchouc product which has been vulcanized in the presence of an amine hydroquinone reaction product.

17. The process of producing vulcanized rubber possessing age resistant characteristics which comprises heating rubber and sulphur in the presence of a compound obtained by inter-acting a secondary amine and a poly-hydroxy-benzene.

18. The process of producing vulcanized rubber possessing age resistant characteristics which comprises heating rubber and sulphur in the presence of a compound obtained by inter-acting a secondary aromatic amine and a poly-hydroxy-benzene.

19. An age resisting rubber product comprising the vulcanization product of a mixture of rubber, sulphur and the compound obtained by inter-acting a secondary amine and a poly-hydroxy-benzene.

20. An age resisting rubber product comprising the vulcanization product of a mixture of rubber, sulphur and the compound obtained by inter-acting a secondary aromatic amine and a poly-hydroxy-benzene.

21. A caoutchouc product which has been vulcanized in the presence of an alpihatic amine-aryl polyhydroxide reaction product.

In testimony whereof I affix my signature.

WINFIELD SCOTT.